US012154423B2

(12) United States Patent
Chu et al.

(10) Patent No.: US 12,154,423 B2
(45) Date of Patent: Nov. 26, 2024

(54) METHOD AND APPARATUS FOR ASSISTED PARKING

(71) Applicant: APOLLO INTELLIGENT DRIVING TECHNOLOGY (BEIJING) CO., LTD., Beijing (CN)

(72) Inventors: Changsen Chu, Beijing (CN); Jia Song, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 180 days.

(21) Appl. No.: 17/891,802

(22) Filed: Aug. 19, 2022

(65) Prior Publication Data

US 2022/0392329 A1 Dec. 8, 2022

(30) Foreign Application Priority Data

Aug. 25, 2021 (CN) .......................... 202110980514.8

(51) Int. Cl.
| | |
|---|---|
| *G08B 21/00* | (2006.01) |
| *G06V 20/58* | (2022.01) |
| *G06V 30/14* | (2022.01) |
| *G08B 21/24* | (2006.01) |
| *H04W 4/02* | (2018.01) |

(52) U.S. Cl.
CPC .......... *G08B 21/24* (2013.01); *G06V 20/586* (2022.01); *G06V 30/14* (2022.01); *H04W 4/025* (2013.01)

(58) Field of Classification Search
CPC ...... G08B 21/24; G06V 20/586; G06V 30/14; G06V 20/588; G06V 20/62; G06V 30/10; G06V 20/56; H04W 4/025; G01S 2205/01; G01S 5/16; G01S 19/42; G08G 1/144; G08G 1/005; G08G 1/0175; G08G 1/04; G08G 1/205
USPC .......................................................... 340/8.1
See application file for complete search history.

(56) References Cited

U.S. PATENT DOCUMENTS

| | | | |
|---|---|---|---|
| 2015/0286880 A1* | 10/2015 | Itou | B60L 53/37 |
| | | | 348/148 |
| 2015/0360613 A1 | 12/2015 | Lee | |
| 2016/0001704 A1* | 1/2016 | Nakasho | B60R 1/27 |
| | | | 701/36 |
| 2018/0338109 A1 | 11/2018 | Badr et al. | |
| 2020/0192362 A1* | 6/2020 | Murad | G06V 20/586 |
| 2020/0258388 A1* | 8/2020 | Nakka | G08G 1/143 |
| 2022/0415173 A1* | 12/2022 | Agarwal | G01C 21/3415 |

FOREIGN PATENT DOCUMENTS

| | | |
|---|---|---|
| CN | 2428345 Y | 5/2001 |
| CN | 109637177 A | 4/2019 |
| CN | 110781883 A | 2/2020 |

(Continued)

*Primary Examiner* — Mark S Rushing
(74) *Attorney, Agent, or Firm* — Leydig, Voit & Mayer, Ltd.

(57) ABSTRACT

A computer-implemented method for assisted parking, an electronic device, and a storage medium are provided. The method for assisted parking includes: obtaining a set of images around a vehicle; determining environment information for the vehicle based on the set of images; obtaining location information associated with a target parking location according to the environment information; and sending the location information to provide such to a user terminal.

20 Claims, 5 Drawing Sheets

(56) References Cited

FOREIGN PATENT DOCUMENTS

| CN | 111243322 A | 6/2020 |
|---|---|---|
| WO | 2020164484 A1 | 8/2020 |
| WO | 2021023420 A1 | 2/2021 |

* cited by examiner

METHOD AND APPARATUS FOR ASSISTED PARKING

CROSS REFERENCE TO RELATED APPLICATIONS

This application claims priority to Chinese Patent Application No. 202110980514.8, filed on Aug. 25, 2021, the contents of which are hereby incorporated by reference in their entirety for all purposes

TECHNICAL FIELD

The present disclosure relates to the field of computers, and more specifically, relates to a computer-implemented method for assisted parking, an electronic device, and a storage medium.

BACKGROUND

Traveling by car has become a preferred mode of travel for people because of its convenience. When a driver parks the car in an unfamiliar parking lot, for example, it is likely to forget a specific parking location, so some auxiliary means are needed to memorize the parking location, so that the driver can conveniently find a vehicle when leaving.

SUMMARY

According to an example embodiment of the present disclosure, a solution for assisted parking is provided.

In a first aspect of the present disclosure, a computer-implemented method for assisted parking is provided. The method includes: obtaining a set of images around a vehicle; determining environment information for the vehicle based on the set of images; obtaining location information associated with a target parking location according to the environment information; and sending the location information to provide such to a user terminal.

In a second aspect of the present disclosure, an electronic device is provided. The electronic device includes one or more processors; and a memory storing one or more programs The one or more programs, when executed by the one or more processors, enables the one or more processors to implement operations including: obtaining a set of images around a vehicle; determining environment information for the vehicle based on the set of images; obtaining location information associated with a target parking location according to the environment information; and sending the location information to provide such to a user terminal.

In a third aspect of the present disclosure, a non-transitory computer readable storage medium is provided and stores a computer program. The program, when executed by a processor, implements operations including: obtaining a set of images around a vehicle; determining environment information for the vehicle based on the set of images; obtaining location information associated with a target parking location according to the environment information; and sending the location information to provide such to a user terminal.

It should be understood that the content described in the specification section is not intended to limit key or important features of embodiments of the present disclosure, nor is it intended to limit the scope of the present disclosure. Other features of the present disclosure will become easy to understand from the following description.

BRIEF DESCRIPTION OF THE DRAWINGS

The above and other features, advantages and aspects of various embodiments of the present disclosure will become more apparent in conjunction with the accompanying drawings and with reference to the following detailed description. In the drawings, same or similar reference numbers refer to same or similar elements. Specifically.

DETAILED DESCRIPTION

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for the purpose of a more thorough and complete understanding of the present disclosure. It should be understood that the drawings and embodiments of the present disclosure are only for example purposes, and are not intended to limit the protection scope of the present disclosure.

In the description of embodiments of the present disclosure, the term "including" and the like should be understood as open-ended inclusion, i.e., "including but not limited to". The term "based on" should be understood as "based at least in part on". The terms "one embodiment" or "the embodiment" should be understood as "at least one embodiment". The terms "first", "second", etc. may refer to different or the same objects. Other explicit and implicit definitions may also be included below.

As mentioned above, after a driver or user parks the car in an unfamiliar parking environment, is the driver or user usually need to memorize the parking space. A conventional practice is that the driver memorizes through manual operation/by brain, or manually takes a photo and saves it in a mobile phone. However, after a certain period of time, parking space information memorized by the user's brain can be easily forgotten. As for the mode of taking pictures and recording through the mobile phone, the operation is complicated and the user experience is not good enough. In addition, even if the photo is taken, in the case of a large parking lot, the user still needs to spend a lot of time in finding his/her own vehicle, which is time-consuming and effort-consuming.

In order to at least partially solve the above problems and other potential problems, this application proposes a solution for assisting the user in parking. In the solution, environment information around the vehicle (for example, a transparent chassis of the vehicle) may be obtained through photos acquired in a driving process or upon parking of the vehicle, and it is identified whether the environment information has location information associated with a parking location, such as parking space number, parking space layout or vehicle positioning information. The above location information is provided or sent to the user so as to assist the user in finding a target parking space.

In this way, the situation where the user cannot find the vehicle due to neglecting and forgetting to record a vehicle location can be avoided, thereby reducing the user's operation and memory burdens. Moreover, the user can directly obtain the location information of the vehicle parking space without redundant operations, which greatly improves the user experience. In addition, the solution can be implemented without any hardware or system in a parking lot, and instead, it can be implemented merely by a system of the vehicle itself, so system costs such as software and hardware for user interaction can be saved.

The embodiments of the present disclosure will be described in detail below with reference to the accompanying drawings.

Figure 1:
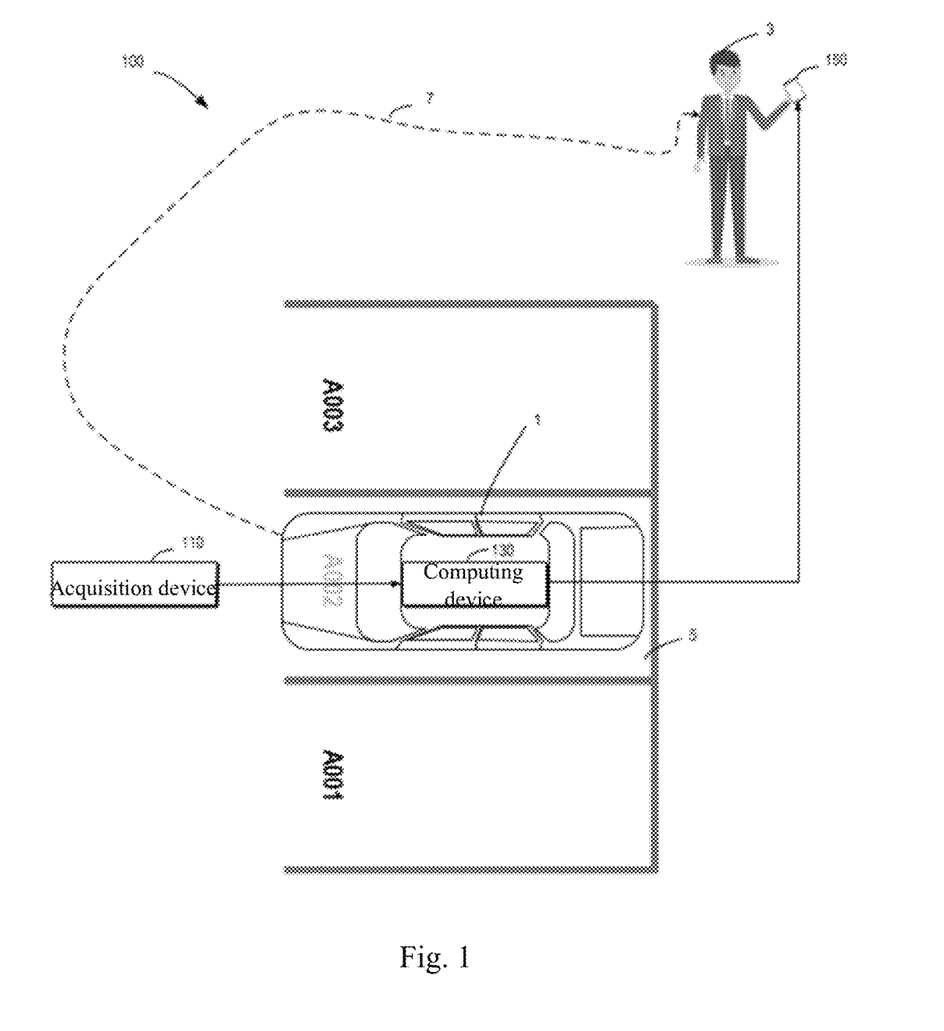
FIG. 1 illustrates a schematic diagram of an example environment in which various embodiments of the present disclosure can be implemented.

FIG. 1 illustrates a schematic diagram of an example environment 100 in which various embodiments of the present disclosure can be implemented. In the example environment 100, a user 3 parks a vehicle 1 in a parking space 5 (which may also be referred to as a "parking spot") of a parking region. In some embodiments, the vehicle 1 may be any motor vehicle or non-motor vehicle, such as a car, a truck, a motorcycle, a bus, an electric vehicle, a police car, a fire truck, or a vehicle that performs as special work equipment and any other suitable vehicle, which is not limited in the present disclosure. The parking region should be widely understood, which may be a region of the parking space 5, or may refer to a region of an entire parking lot. In some embodiments, the user 3 may be a driver (chauffeur), a passenger of the vehicle 1, or any suitable authorized person who may interact with the vehicle 1, and the number of user 3 is not limited to one.

It should be noted that, in a parking operation of some autonomous or semi-autonomous vehicles, the vehicle 1 is not necessarily driven into the parking space 5 by the user 3, and the vehicle 1 may enter the parking space 5 through autonomous parking or semi-autonomous parking. This scenario also applies to the present disclosure.

In some embodiments, during a process of the vehicle 1 entering the parking space 5, when the vehicle 1 is parked at the parking space 5, or at any other suitable timing, a set of images around the vehicle may be acquired by a acquisition device 110. The acquisition device 110 may include a surround-view camera, a front-view camera, a rear-view camera deployed on the vehicle, or any other suitable cameras, or a special camera for acquiring the images may also be arranged on the vehicle to obtain the set of images. In this way, it may be implemented without any hardware or system of the parking lot, and may be implemented only by a system of the vehicle itself, so cost of systems such as software and hardware for user interaction may be saved.

It should be noted that the above acquisition device 110 is only example, and any other suitable acquisition device, such as a camera, a sensor, or a scanner, may also be adopted, which is not limited in the present disclosure.

It should also be noted that the embodiment in which the acquisition device 110 is deployed on the vehicle 1 is example, and the acquisition device 110 may also be arranged around the parking region, as long as a corresponding set of pictures can be obtained.

In some embodiments, the set of images may indicate environment information around the vehicle 1, and the set of images may be shot images of a surrounding environment. Furthermore, the set of images may be processed to obtain the environment information of the vehicle 1. In one embodiment, a computing device 130 may be used to perform feature extraction on the set of images. For example, feature extraction for the set of images may be realized by scale-invariant feature transform (SIFT), a histogram of oriented gradient (HOG), oriented FAST and rotated BRIEF (ORB) or HAAR or any other suitable computing method deployed on the computing device 130. And the computing device 130 may also be used to perform data fusion on the set of images based on the extracted features, so as to obtain complete or relatively complete environment information around the vehicle 1. In some embodiments, as shown in FIG. 1, the environment information may include obstacle information around the vehicle 1, ground information (such as parking space number information, layout information of a parking space, etc.), parking line information of a parking space, road information of a parking lot, traffic flow information of a parking lot, vehicle positioning location information, etc.

In some embodiments, the computing device 130 may include a desktop computer, a tablet computer, a personal digital assistant (PDA), a server, a mainframe, etc., or any other processor-enabled device capable of performing wired or wireless data communication. The computing device 130 may be any computing device arranged outside the vehicle 1, or may be arranged on or in the vehicle 1, that is, the computing device 130 may be a vehicle-mounted computing device. In the embodiment shown in FIG. 1, an example in which the computing device 130 is deployed on the vehicle 1 will be explained.

In one embodiment, in particular, the environment information may be presented by means of a transparent chassis. The transparent chassis enables the computing device 130 to quickly capture a road surface state when the vehicle 1 is at a low speed or is parked, thereby helping to prompt for obstacles or display road surface and surrounding environment conditions, etc. Specifically, in one embodiment, a real-time image under a chassis of the vehicle 1 may be transmitted to a vehicle-mounted display device through the acquisition device 110 (e.g., the camera), so that the driver can see a condition of a road beneath. In such an embodiment, the environment information may be information presented by the transparent chassis of the vehicle 1. In this way, the environment information may be integrated with transparent chassis data of the vehicle 1, facilitating data synchronization and further processing.

In one embodiment, the location information associated with the parking space 5 (i.e., a target parking location) may be obtained according to the environment information. In some embodiments, the location information may be one or more of parking space number information, layout information of a parking space, and vehicle positioning information. It should be understood that the location information may also be other location information that may assist in parking, which is not limited in the present disclosure.

In some embodiments, as shown in FIG. 1, a manner of obtaining the location information may be identifying the environment information in the environment information. For example, in one embodiment, when the location information includes the parking space number information, it may be identified whether the environment information includes text information. In some embodiments, identifying whether the environment information includes the text information may be implemented through OCR identification technology or any other suitable identification technology. In some embodiments, when it is identified that the environment information includes the text information, it may be determined whether the text information includes the parking space number information. When the text information does not include the parking space number information, the identifying operation of the computing device 130 may be terminated. When it is identified that the text information includes the parking space information, the parking space number information of the parking space 5 may be further extracted from the text information. For example, as shown in FIG. 1, the parking space number information of the current parking space 5 is "A002", and when the vehicle 1 is parked at the parking space 5, the computing device 110 performs the above-mentioned operation on the set of images acquired by the acquisition device 110 as described above and extracts the number information of the parking space 5 as "A002", which is sent to a user terminal 150 through the computing device 130, to prompt the user 3 of the parking space number information of the parking space 5. In this way, rapid identification and extraction of the parking space number information may be achieved. This will be explained in more detail below in combination with FIG. 2.

In another embodiment, the layout information of a parking space of the parking region may also be extracted or the vehicle positioning information may also be obtained, and the information may be sent to the user terminal 150 through the computing device 130, which will be described in more detail below in combination with FIG. 2.

It should be understood that in a process of extracting the location information, the location information may not necessarily be presented to the user, but may be directly sent to the user terminal. However, in the above embodiment of the transparent chassis, the location information may also be presented via the transparent chassis. That is, the presented environment information may include at least a part or all of the location information. This is because some location information, such as the vehicle positioning information, is usually not presented in the vehicle's transparent chassis. For some location information that may be displayed visually, such as the parking space number information or the layout information of a parking space, it may be presented in the transparent chassis. In this way, the information that the user cares about may be selectively presented, so that an information prompt is more targeted, and the amount of data processing may be effectively reduced.

In some embodiments, with further reference to FIG. 1, the user terminal 150 may be used to communicate with the computing device 130 to receive the location information. The user terminal 150 may include any suitable user terminal such as a mobile phone, a PDA, a notebook computer, a PC or a tablet computer, which is not limited in the present disclosure. Hereinafter, the embodiment of the present disclosure will be described by taking the user terminal 150 being the mobile phone as an example.

In such an embodiment, as shown in FIG. 1, when the user 3 parks the vehicle 1 into the parking space 5 and moves away from the parking region along a path 7, the user terminal 150 (i.e., the "mobile phone") held by the user 3 may receive the location information on the vehicle 1 from the computing device 130 of the vehicle 1, and present the information to the user. In some embodiments, the manner of presentation to the user includes one or more of voice, text, picture or video, which is not limited in the present disclosure.

In other embodiments, the user 3 may also make the vehicle 1 automatically park into the parking space 5 through operation. Here, the vehicle 1 may send the location information of the parking space 5 to the user terminal 150 in the manner as described above. In this way, the user 3 may obtain the location information of the vehicle 1 without participating in the parking process, and may obtain guidance based on the location information when searching the vehicle, so the user experience is further improved. This can be very advantageous, because in some parking regions, the vehicle 1 and the mobile terminal 150 may be unable to communicate with each other in time due to poor signal, etc. Therefore, under a condition that an automatic parking function cannot be effectively awakened, the user may also find the vehicle 1 in time by the prompt of the location information with a small amount of transmission.

In some embodiments, further in combination with FIG. 1, obtaining the location information associated with the parking space 5 may be identifying vehicle layout information from the environment information. Specifically, layout information images of the parking space may be obtained by the acquisition device 110, and after the corresponding features are extracted, the features may be sent to the user terminal 150 through the computing device 130. For example, the acquisition device 110 may acquire the information of parking spaces numbered "A001" and "A003" together with lane lines, and may further acquire information of other parking spaces and lanes around "A002" and finally generate a plan view and send it to the user terminal 150. In this way, when the user 3 picks up the car, he/she may navigate to the parking space 5 where the vehicle 1 is located through the plan view, so that the vehicle may be quickly found.

It should be noted that the above manner of the plan view is only example, and a stereogram, a multi-dimensional diagram, an animation scene, etc. may also be generated to assist the user 3 in finding the target parking space 5 where the vehicle 5 is parked, which is not limited in the present disclosure.

In some embodiments, the walking track 7 of the user 3 may also be recorded, and based on the track 7, a track or a path that guides the user 3 to find the target parking space 5 may be generated. In this way, the user 3 may precisely locate the target parking space 5 based on the path. In one embodiment, the track 7 may also be integrated into the above-mentioned plan view, to realize the prompt to the user 3 more efficiently in the manner of approximate path navigation.

In some embodiments, the vehicle positioning information may also be determined through on-board GPS, and the location information may be sent to an application (App) of the user terminal 150, so that the user 3 may find the target parking space 5 according to the location information. It should be noted that the positioning information of the vehicle may also be determined in other manners, which is not limited in the present disclosure.

It should be noted that the above manners are all example, and those of skill in the art may also use any other suitable manner to find the target parking space 5 and the vehicle 1 efficiently and accurately.

Figure 2:
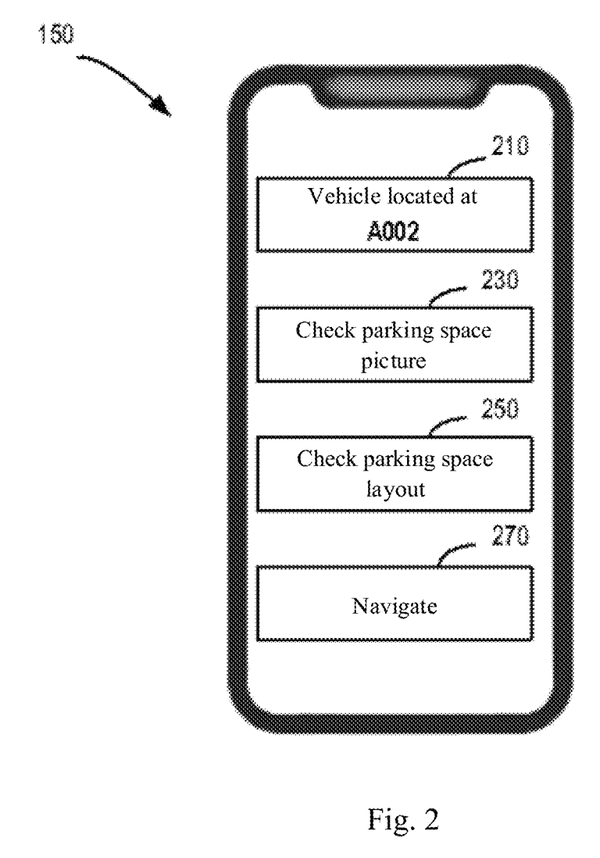
FIG. 2 illustrates an example interface view of a user terminal of an embodiment according to FIG. 1.

FIG. 2 illustrates an example interface view of the user terminal 150 of the embodiment according to FIG. 1. In some embodiments, as shown in FIG. 2, the user terminal 150 includes a mobile phone, and what is shown in FIG. 2 is a display section of the mobile phone. In FIG. 2, an interface of the user terminal 150 may include one or more of the parking space number information 210, parking space picture information 230, the layout information of the parking space 250, and the vehicle positioning information 270. It should be understood that in different usage scenarios, the above information may be used individually or in combination to be provided to the user terminal 150.

In some embodiments, at block 210, the vehicle number information may be prompted by the user terminal 150. In the example implementation of FIG. 1, the vehicle number information of the parking space 5 is "A002". Therefore, in this interface, the location information prompted to the user 3 is "A002".

In some embodiments, at block 230, a relevant picture of the parking space 5 may be sent directly to the mobile phone of the user 3. The picture may include a picture of the parking space 5 taken manually in a conventional manner, and may be further processed by the computing device 130 so that the picture may be presented to the user 3 more clearly. It should be noted that the above manner is only example, and the picture may also be sent to the user terminal 150 in any other suitable manner, which is not limited in the present disclosure.

In some embodiments, at block 250, the obtained layout information of a parking space may be sent to the user terminal. For example, as mentioned above, relevant layout information such as adjacent parking space information, vehicle passage information, and pedestrian passages may be sent to the user 3, so that the user 3 may more accurately find the target parking space 5 and the user experience may be further improved. The vehicle layout information may be, for example, in any suitable manner, such as the plan view, the multi-dimensional diagram, or a visual animation as previously described.

In some embodiments, at block 270, the user terminal 150 may receive GPS location information and navigate directly to a GPS location based on the determined GPS location information. In one embodiment, in a usage scenario where a GPS signal is weak, navigation to the target parking space 150 may also be performed based on the positioning information and the information of the track 7 recorded in FIG. 1. In this way, it is convenient for the user 3 to find the target parking space 5 more accurately, thereby further improving the user experience.

It should be noted that the above blocks 210, 230, 250 and 270 are only example, and may be used alternatively or in combination, as long as they can play a corresponding prompting role. The present disclosure does not limit this.

Figure 3:
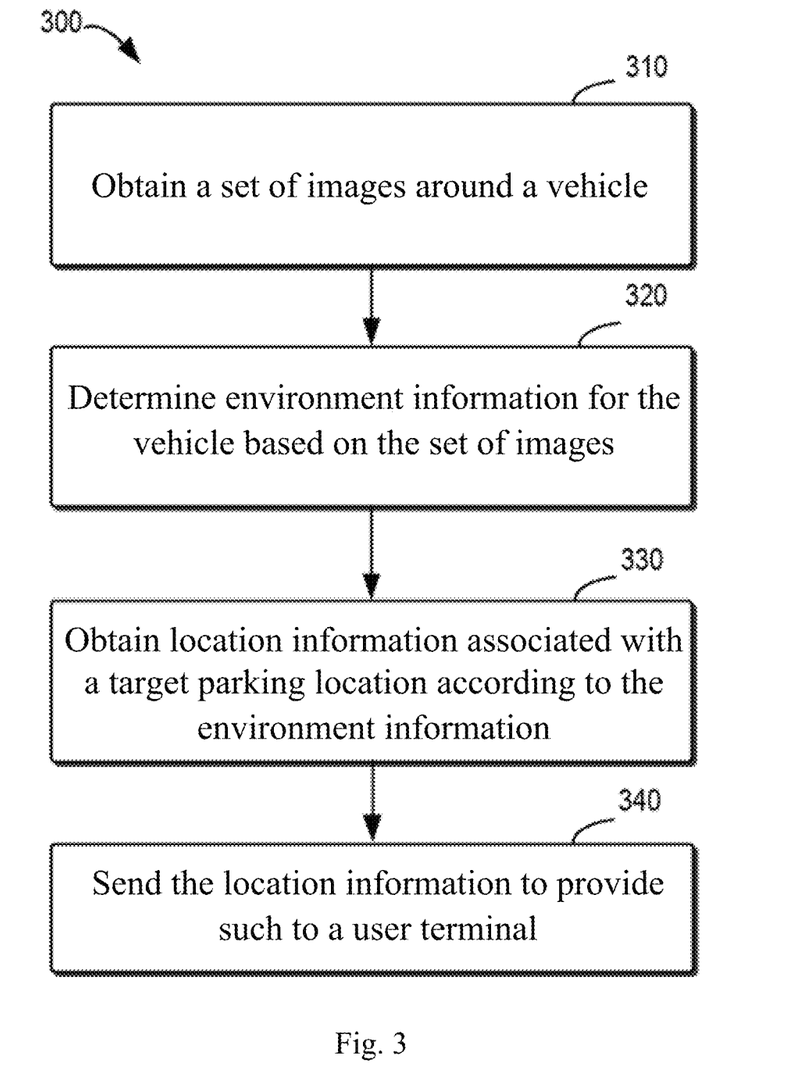
FIG. 3 illustrates a flow chart of a process used for assisted parking in some embodiments of the present disclosure.

FIG. 3 illustrates a flow chart of a process used for assisted parking according to some embodiments of the present disclosure. The process 300 may be implemented by the computing device 130 of FIG. 1. For convenience of discussion, the process 300 will be described in combination with FIG. 1.

At block 310, a set of images around the vehicle 1 is obtained.

In some embodiments, the set of images may be environment images around the vehicle, and the environment images may be obtained through at least one of: a vehicle surround-view camera, a front-view camera, a rear-view camera and a special camera.

In one embodiment, as shown in FIG. 1, the set of images may be obtained via the acquisition device 110, and the acquisition device 110 may include a surround-view camera, a front-view camera, a rear-view camera deployed on the vehicle, or any other suitable cameras, or a special camera may also be arranged on the vehicle to obtain the set of images. It should be noted that the above acquisition device 110 is only example, and any other suitable acquisition device, such as a camera, a sensor, or a scanner, may also be adopted, which is not limited in the present disclosure.

At block 320, environment information for the vehicle 1 is determined based on the set of images.

In some embodiments, a transparent chassis of the vehicle associated with the environment information may be generated based on the set of images around the vehicle 1, and the environment information for the vehicle 1 may be presented via the transparent chassis.

In some embodiments, as mentioned above, a computing device 130 may be used to perform feature extraction on the set of images. For example, feature extraction for the set of images may be realized by SIFT, HOG, ORB or HAAR or any other suitable computing method deployed on the computing device 130. And the computing device 130 may also be used to perform data fusion on the set of images based on extracted features, so as to obtain environment information around the vehicle 1. In some embodiments, as shown in FIG. 1, the environment information may include obstacle information around the vehicle 1, ground information (such as parking space number information, layout information of a parking space, etc.), parking line information of a parking space, road information of a parking lot, traffic flow information of a parking lot, etc.

In some embodiments, the location information may include at least one of: parking space number information, layout information of a parking space, and vehicle positioning information.

At block 330, location information associated with a target parking location is obtained according to the environment information.

In some embodiments, as mentioned above, the location information may be one or more of the parking space number information, the layout information of a parking space, and the vehicle positioning information. It should be understood that the location information may also be other location information that may assist in parking, which is not limited in the present disclosure.

In some embodiments, the location information includes the parking space number information, and obtaining the location information associated with the target parking location may include: determining that the environment information includes the text information; determining whether the text information includes the parking space number information; and obtaining, in response to determining that the text information includes the parking space number information, the parking space number information of the target parking location based on the text information.

In some embodiments, identifying whether the environment information includes the text information may be implemented through OCR identification technology or any other suitable identification technology. In some embodiments, when it is identified that the text information includes the parking space information, the parking space number information of the parking space 5 may be further extracted from the text information. For example, as shown in FIG. 1, the parking space number information of a current parking space 5 is "A002", and when the vehicle 1 is parked at the parking space 5, the computing device 110 performs the above-mentioned operation on the set of images acquired by the acquisition device 110 as described above and extracts the number information of the parking space 5 as "A002", which is sent to a user terminal 150 through the computing device 130 to prompt the user 3 of the parking space number information of the parking space 5.

In some embodiments, the presented environment information may include location information.

At block 340, the location information is sent to provide such to the user terminal 150.

In some embodiments, the user terminal 150 may include any suitable user terminal such as a mobile phone, a PDA, a notebook computer, a PC or a tablet computer. For example, the user terminal 150 may be the mobile phone shown in FIG. 1 and FIG. 2.

Figure 4:
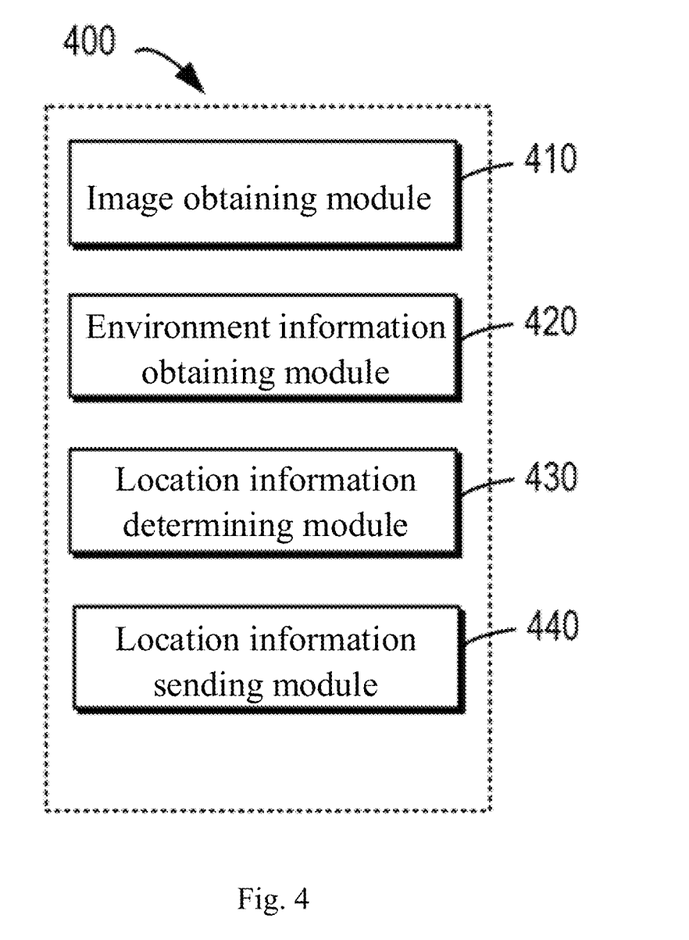
FIG. 4 illustrates a schematic block diagram of an apparatus used for assisted parking in an embodiment of the present disclosure.

FIG. 4 illustrates a schematic block diagram of an apparatus 400 for assisted parking in an embodiment of the present disclosure. The apparatus may be included in the computer device 130 shown in FIG. 1 or be implemented as the computer device 130. As shown in FIG. 4, the apparatus 400 includes an image obtaining module 410, configured to obtain a set of images around a vehicle. The apparatus 400 further includes an environment information obtaining module 420, configured to obtain environment information for the vehicle based on the set of images. The apparatus 400 further includes a location information determining module 430, configured to determine location information associated with a target parking location according to the environment information. The apparatus 400 further includes a location information sending module 440, configured to send the location information to provide such to a user terminal.

In some embodiments, the environment information obtaining module 420 may include: a transparent chassis generating module, configured to generate a transparent chassis of the vehicle associated with the environment information based on the set of images around the vehicle; and an environment information presenting module, configured to present the environment information for the vehicle via the transparent chassis.

In some embodiments, the location information may include at least one of the following: parking space number information, layout information of a parking space, and vehicle positioning information.

In some embodiments, the location information may include the parking space number information, and the location information determining module 430 may include: a text information determining module, configured to determine that the environment information includes text information; a parking space number information determining module, configured to determine whether the text information includes the parking space number information; and a1 parking space number information obtaining module, configured to obtain, in response to determining that the text information includes the parking space number information, the parking space number information of the target parking location based on the text information.

In some embodiments, the presented environment information may include the location information. In such embodiments, the location information may be presented like the environment information, instead of being directly sent to the user terminal 150 after being obtained.

In some embodiments, the set of images around the vehicle is obtained through at least one of: a vehicle surround-view camera, a front-view camera, a rear-view camera and a special camera.

Figure 5:
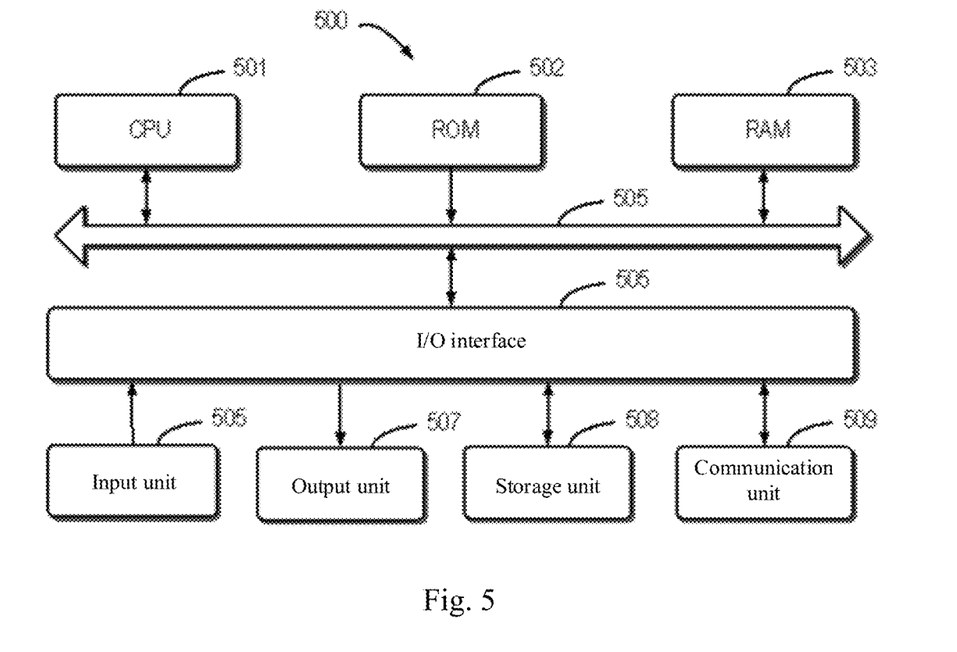
FIG. 5 illustrates a block diagram of a computing device that can implement a plurality of embodiments of the present disclosure.

FIG. 5 illustrates a block diagram of a computing device that can implement a plurality of embodiments of the present disclosure. A device 500 may be used to implement the computing device 130 of FIG. 1. As shown in the figure, the device 500 includes a central processing unit (CPU) 501 that may perform various suitable actions and processes according to computer program instructions stored in a read only memory (ROM) 502 or loaded into a random access memory (RAM) 503 from a storage unit 508. In the RAM 503, various programs and data necessary for operation of the device 500 may also be stored. The CPU 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, such as a keyboard, a mouse, etc.; an output unit 505, such as various types of displays, speakers, etc.; the storage unit 508, such as a disk, optical disc, etc.; and a communication unit 509, such as a network card, a modem, a wireless communication transceiver, and the like. The communication unit 509 allows the device 500 to exchange information/data with other devices through a computer network such as Internet and/or various telecommunication networks.

The processing unit 501 performs various methods and processes described above, such as the process 300. For example, in some embodiments, the process 300 may be implemented as a computer software program tangibly embodied on a machine-readable medium, such as the storage unit 508. In some embodiments, a part or all of the computer program may be loaded and/or installed on device 500 via the ROM 502 and/or the communication unit 509. When the computer program is loaded into the RAM 503 and is executed by the CPU 501, one or more steps of the process 300 described above may be performed. Alternatively, in other embodiments, the CPU 501 may be configured to execute the process 300 by any other suitable means (e.g., by means of firmware).

The functions described herein above may be performed, at least in part, by one or more hardware logic components. For example, without limitation, example types of hardware logic components that may be used include: field programmable gate arrays (FPGAs), application specific integrated circuits (ASICs), application specific standard products (ASSPs), system on chips (SOCs), load programmable logic device (CPLD) and so on.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

Furthermore, although operations are depicted in a particular order, it should be understood to require that such operations be performed in the shown particular order or in a sequential order, or to require that all illustrated operations should be performed to achieve desired results. Under certain circumstances, multitasking and parallel processing may be advantageous. Likewise, although the above description contains several implementation-specific details, these should not be construed as limitations to the scope of the present disclosure. Certain features that are described in the context of separate embodiments can also be implemented in combination in a single implementation. Conversely, various features that are described in the context of a single implementation can also be implemented in a plurality of implementations separately or in any suitable sub-combination.

Although the subject matter has been described in language specific to structural features and/or logical acts of method, it should be understood that the subject matter defined in the appended claims is not necessarily limited to specific features or acts described above. Rather, the specific features and acts described above are merely example forms of implementing the claims.

What is claimed is:

1. A computer-implemented method for assisted parking, the method comprising:
   obtaining a set of images around a vehicle;
   determining environment information for the vehicle based on the set of images;
   obtaining, according to the environment information, location information associated with a target parking location, the location information comprising the target parking location and other parking locations around the target parking location;
   generating a plan view of the target parking location and the other parking locations around the target parking location;
   recording a walking track of a user of the vehicle;
   integrating the walking track into the plan view; and
   sending the location information and the plan view integrated with the walking track to a user terminal.

2. The method according to claim 1, wherein the determining the environment information for the vehicle comprises:
   generating a transparent chassis of the vehicle associated with the environment information based on the set of images around the vehicle; and
   presenting the environment information for the vehicle via the transparent chassis.

3. The method according to claim 1, wherein the location information comprises at least one of: parking space number information, layout information of a parking space, or vehicle positioning information.

4. The method according to claim 3, wherein the location information comprises the parking space number information, and wherein the obtaining the location information associated with the target parking location comprises:
   determining that the environment information comprises text information;
   determining whether the text information comprises the parking space number information; and
   obtaining, in response to determining that the text information comprises the parking space number information, the parking space number information of the target parking location based on the text information.

5. The method according to claim 2, wherein the environment information comprises the location information.

6. The method according to claim 1, wherein the set of images around the vehicle is obtained through at least one of: a vehicle surround-view camera, a front-view camera, a rear-view camera, or a special camera.

7. The method according to claim 2, wherein the location information comprises at least one of: parking space number information, layout information of a parking space, or vehicle positioning information.

8. An electronic device, comprising:
   one or more processors; and
   a memory storing one or more programs, wherein the one or more programs, when executed by the one or more processors, enable the one or more processors to implement operations comprising:
   obtaining a set of images around a vehicle;
   determining environment information for the vehicle based on the set of images;
   obtaining, according to the environment information, location information associated with a target parking location, the location information comprising the target parking location and other parking locations around the target parking location;
   generating a plan view of the target parking location and the other parking locations around the target parking location;
   recording a walking track of a user of the vehicle;
   integrating the walking track into the plan view; and
   sending the location information and the plan view integrated with the walking track to a user terminal.

9. The electronic device according to claim 8, wherein the determining the environment information for the vehicle comprises:
   generating a transparent chassis of the vehicle associated with the environment information based on the set of images around the vehicle; and
   presenting the environment information for the vehicle via the transparent chassis.

10. The electronic device according to claim 8, wherein the location information comprises at least one of: parking space number information, layout information of a parking space, or vehicle positioning information.

11. The electronic device according to claim 10, wherein the location information comprises the parking space number information, and wherein the obtaining the location information associated with the target parking location comprises:
   determining that the environment information comprises text information;
   determining whether the text information comprises the parking space number information; and
   obtaining, in response to determining that the text information comprises the parking space number information, the parking space number information of the target parking location based on the text information.

12. The electronic device according to claim 9, wherein the environment information comprises the location information.

13. The electronic device according to claim 8, wherein the set of images around the vehicle is obtained through at least one of: a vehicle surround-view camera, a front-view camera, a rear-view camera, or a special camera.

14. The electronic device according to claim 9, wherein the location information comprises at least one of: parking space number information, layout information of a parking space, or vehicle positioning information.

15. A non-transitory computer readable storage medium storing a computer program, wherein the computer program, when executed by a processor, implements operations comprising:
- obtaining a set of images around a vehicle;
- determining environment information for the vehicle based on the set of images;
- obtaining, according to the environment information, location information associated with a target parking location, the location information comprising the target parking location and other parking locations around the target parking location;
- generating a plan view of the target parking location and the other parking locations around the target parking location;
- recording a walking track of a user of the vehicle;
- integrating the walking track into the plan view; and
- sending the location information and the plan view integrated with the walking track to a user terminal.

16. The non-transitory computer readable storage medium according to claim 15, wherein the determining the environment information for the vehicle comprises:
- generating a transparent chassis of the vehicle associated with the environment information based on the set of images around the vehicle; and
- presenting the environment information for the vehicle via the transparent chassis.

17. The non-transitory computer readable storage medium according to claim 15, wherein the location information comprises at least one of: parking space number information, layout information of a parking space, or vehicle positioning information.

18. The non-transitory computer readable storage medium according to claim 17, wherein the location information comprises the parking space number information, and wherein the obtaining the location information associated with the target parking location comprises:
- determining that the environment information comprises text information;
- determining whether the text information comprises the parking space number information; and
- obtaining, in response to determining that the text information comprises the parking space number information, the parking space number information of the target parking location based on the text information.

19. The non-transitory computer readable storage medium according to claim 16, wherein the environment information comprises the location information.

20. The non-transitory computer readable storage medium according to claim 15, wherein the set of images around the vehicle is obtained through at least one of: a vehicle surround-view camera, a front-view camera, a rear-view camera, or a special camera.

* * * * *